United States Patent
Tan et al.

(10) Patent No.: US 10,491,790 B2
(45) Date of Patent: Nov. 26, 2019

(54) IMAGING MODULE AND READER FOR, AND METHOD OF, VARIABLY ILLUMINATING TARGETS TO BE READ BY IMAGE CAPTURE OVER A RANGE OF WORKING DISTANCES

(71) Applicant: SYMBOL TECHNOLOGIES, LLC, Lincolnshire, IL (US)

(72) Inventors: Chinh Tan, Setauket, NY (US); Carl D. Wittenberg, Water Mill, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/076,721

(22) Filed: Mar. 22, 2016

(65) Prior Publication Data
US 2017/0280028 A1 Sep. 28, 2017

(51) Int. Cl.
*H04N 5/225* (2006.01)
*H04N 5/235* (2006.01)
*G06K 7/10* (2006.01)

(52) U.S. Cl.
CPC ............. *H04N 5/2256* (2013.01); *G06K 7/10* (2013.01); *H04N 5/2258* (2013.01)

(58) Field of Classification Search
CPC .. H04N 5/2256; H04N 5/2258; H04N 5/2352; H04N 5/2354; G06K 7/10722; G06K 7/14; G06K 7/10881; G06K 7/10811; G06K 7/10732; G06K 7/0166; G06K 2007/10524
USPC ............. 348/113, 118, 143, 153, 159, 216.1, 348/217.1, 224.1, 370, 371, 375, 140, 348/211.9, 158; 235/454, 462.11, 462.17, 235/462.24, 462.41, 462.42, 462.01, 235/462.02; 396/69, 165, 61, 62, 65, 80
See application file for complete search history.

(56) References Cited

U.S. PATENT DOCUMENTS

| | | | | |
|---|---|---|---|---|
| 5,600,121 A | | 2/1997 | Kahn et al. | |
| 5,687,400 A | * | 11/1997 | Ishiguro | ................... G03B 7/16 396/61 |
| 6,029,015 A | * | 2/2000 | Ishiguro | ................... G03B 7/16 396/164 |
| 6,340,114 B1 | | 1/2002 | Correa et al. | |
| 9,185,306 B1 | | 11/2015 | Tan et al. | |

(Continued)

FOREIGN PATENT DOCUMENTS

WO 2009/061317 A1 5/2009

OTHER PUBLICATIONS

International Search Report and Written Opinion for corresponding International Patent Application No. PCT/US2016/068201 dated Apr. 12, 2017.

*Primary Examiner* — Marly S Camargo
(74) *Attorney, Agent, or Firm* — Yuri Astvatsaturov

(57) ABSTRACT

A range finder determines a distance to a target to be read by image capture over a range of working distances. Near and far imagers can capture return light from the target over relatively wider and relatively narrower imaging fields of view, respectively. An illuminating light assembly illuminates the target with illumination light of variable intensity. A controller selects at least one of the imagers and energizes the illuminating light assembly to illuminate the target with illumination light having an intensity that is a function of the distance determined by the range finder.

15 Claims, 7 Drawing Sheets

(56) References Cited

U.S. PATENT DOCUMENTS

| | | | |
|---|---|---|---|
| 9,342,724 B2* | 5/2016 | McCloskey | G06K 7/14 235/462.01 |
| 10,142,531 B2* | 11/2018 | Handshaw | H04N 5/2256 348/136 |
| 2002/0125322 A1 | 9/2002 | McCall et al. | |
| 2002/0176605 A1* | 11/2002 | Stafsudd | G06K 9/3241 382/106 |
| 2004/0105674 A1* | 6/2004 | Yeh | G03B 15/05 396/155 |
| 2004/0159703 A1 | 8/2004 | Kogan et al. | |
| 2005/0199719 A1* | 9/2005 | Hepworth | G06K 7/10 235/454 |
| 2005/0258252 A1 | 11/2005 | Winter et al. | |
| 2008/0164315 A1 | 7/2008 | Pankow | |
| 2009/0095047 A1 | 4/2009 | Patel et al. | |
| 2010/0045854 A1* | 2/2010 | Cheng | H04N 5/222 348/371 |
| 2010/0147957 A1 | 6/2010 | Gurevich | |
| 2010/0294839 A1* | 11/2010 | Kawashima | G06K 7/14 235/455 |
| 2012/0126015 A1* | 5/2012 | Wittenberg | G06K 7/14 |
| 2012/0228382 A1 | 9/2012 | Havens et al. | |
| 2014/0176767 A1* | 6/2014 | Hamel | H04N 5/23296 348/240.2 |
| 2015/0178533 A1* | 6/2015 | Canini | G06K 7/10732 235/454 |
| 2015/0339506 A1* | 11/2015 | Chen | G06K 7/10 235/454 |
| 2017/0091571 A1* | 3/2017 | Canini | G06K 9/18 348/136 |
| 2017/0289421 A1* | 10/2017 | Tan | H04N 5/235 348/230.1 |
| 2017/0289451 A1* | 10/2017 | Wittenberg | H04N 5/23245 348/158 |
| 2017/0343345 A1* | 11/2017 | Wittenberg | G01C 3/08 348/135 |

\* cited by examiner

IMAGING MODULE AND READER FOR, AND METHOD OF, VARIABLY ILLUMINATING TARGETS TO BE READ BY IMAGE CAPTURE OVER A RANGE OF WORKING DISTANCES

BACKGROUND OF THE INVENTION

The present invention relates generally to an imaging module and an imaging reader for, and a method of, variably illuminating targets to be read by image capture over a range of working distances.

Solid-state imaging systems or imaging readers have been used, in both handheld and/or hands-free modes of operation, to electro-optically read targets, such as one- and two-dimensional bar code symbol targets, and/or non-symbol targets, such as documents. A handheld imaging reader includes a housing having a handle held by an operator, and an imaging module, also known as a scan engine, supported by the housing and aimed by the operator at a target during reading. The imaging module includes an imaging assembly having a solid-state imager or imaging sensor with an imaging array of photocells or light sensors, which correspond to image elements or pixels in an imaging field of view of the imager, and an imaging lens assembly for capturing return light scattered and/or reflected from the target being imaged, and for projecting the return light onto the array to initiate capture of an image of the target. Such an imager may include a one- or two-dimensional charge coupled device (CCD) or a complementary metal oxide semiconductor (CMOS) device and associated circuits for producing and processing electronic signals corresponding to a one- or two-dimensional array of pixel data over the imaging field of view. In order to increase the amount of the return light captured by the array, for example, in dimly lit environments, the imaging module generally also includes an illuminating light assembly for illuminating the target with illumination light in an illumination pattern for reflection and scattering from the target.

In some applications, for example, in warehouses, it is sometimes necessary for the same reader to read not only far-out targets, e.g., on products located on high overhead shelves, which are located at a far-out range of working distances on the order of thirty to fifty feet away from the reader, but also close-in targets, e.g., on products located at floor level or close to the operator, which are located at a close-in range of working distances on the order of less than two feet away from the reader. The reader illuminates the far-out targets by emitting an intense, bright illumination light in order to enable such targets to be reliably imaged and read. However, when the same bright illumination light illuminates the close-in targets, the imaging array of photocells becomes blinded, and such targets are not readily read. If an aiming assembly is employed to locate a close-in target by directing an aiming pattern thereon, then the bright illumination light may even wash out the aiming pattern and can cause reading performance to deteriorate. In addition, the bright illumination light increases electrical power consumption, and wastes energy. Moreover, the bright illumination light can be bothersome and annoying to the operator and to any nearby passersby.

Accordingly, there is a need to reduce the electrical power consumption of the imaging module and of the overall reader, to prevent the aiming pattern from being washed out, to avoid blinding of the imaging array, to avoid annoying the operator and any passersby, and to reliably read both far-out targets and close-in targets with the same reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
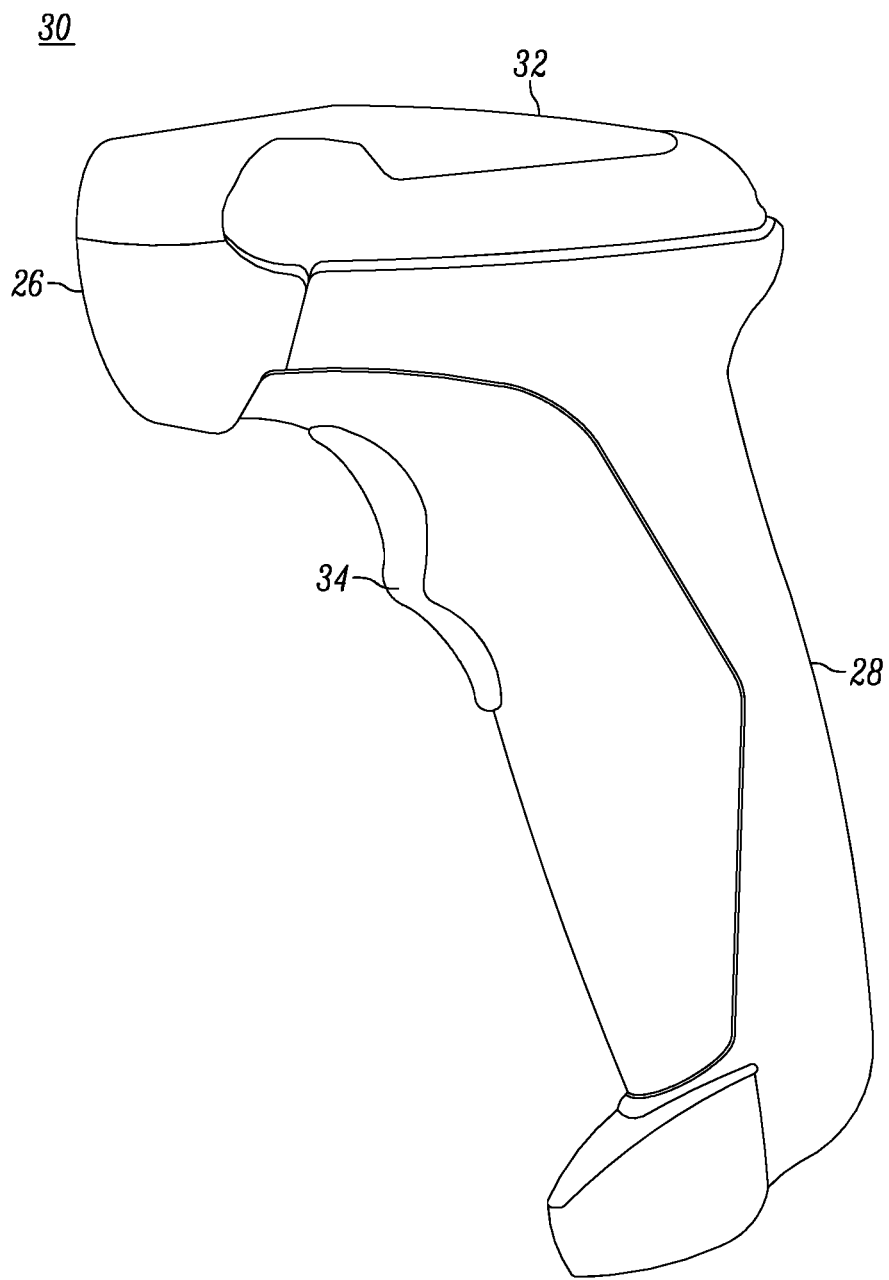
FIG. 1 is a side elevational view of a portable imaging reader operative for illuminating targets over an extended range of working distances in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an imaging module, also known as a scan engine, for variably illuminating targets to be read by image capture over a range of working distances away from the module. Another aspect of the present disclosure relates to an imaging reader having a housing for supporting the imaging module, and a light-transmissive window on the housing. In both aspects, the imaging module comprises an imaging assembly including a near imager for imaging the targets over a relatively wider imaging field of view, and a far imager for imaging the targets over a relatively narrower imaging field of view; an illuminating light assembly for illuminating the targets with illumination light having a variable intensity; a range finder for determining a distance to a target; and a controller or programmed microprocessor. The controller selects at least one of the imagers, and energizes the illuminating light assembly to illuminate the target with illumination light having an intensity that is a function of the distance determined by the range finder. More particularly, the controller selects the near imager, and energizes the illuminating light assembly to illuminate the target with illumination light having a relatively lesser intensity when the range finder determines that the target to be imaged and read by the near imager is located in a close-in region of the range; or the controller selects the far imager, and energizes the illuminating light assembly to illuminate the target with illumination light of a relatively greater intensity when the range finder determines that the target to be imaged and read by the far imager is located in a far-out region of the range; or the controller alternately selects between the near imager and the far imager, and energizes the illuminating light assembly to illuminate the target with illumination light of a relatively intermediate intensity that is between the lesser intensity and the greater intensity when the range finder determines that the target to be imaged and read by the alternately selected imager is located in an intermediate region that is between the close-in region and the far-out region of the range.

Still another aspect of the present disclosure relates to a method of variably illuminating targets to be read by image capture over a range of working distances. The method is performed by providing a near imager to image the targets over a relatively wider imaging field of view, by providing a far imager to image the targets over a relatively narrower imaging field of view, by providing an illuminator to illuminate the targets with illumination light having a variable intensity, by determining a distance to a target, by selecting at least one of the imagers, and by illuminating the target with illumination light having an intensity that is a function of the determined distance.

Hence, far-out targets, intermediate targets, and close-in targets can all be read by the same reader. The less intense illumination light is less likely to blind the near imager, is less likely to wash out any aiming light pattern, is less likely to annoy operators and passersby, and conserves electrical power consumption of the imaging module and of the overall reader.

Reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A light-transmissive window 26 is located adjacent the front or nose of the body 32 and is preferably also tilted at an angle of inclination, for example, fifteen degrees, relative to the vertical. The imaging reader 30 is held in an operator's hand and used in a handheld mode in which a trigger 34 is manually depressed to initiate imaging of targets, especially bar code symbols, to be read in an extended range of working distances, for example, on the order of thirty to fifty feet, away from the window 26. Housings of other configurations, as well as readers operated in the hands-free mode, could also be employed.

Figure 2:
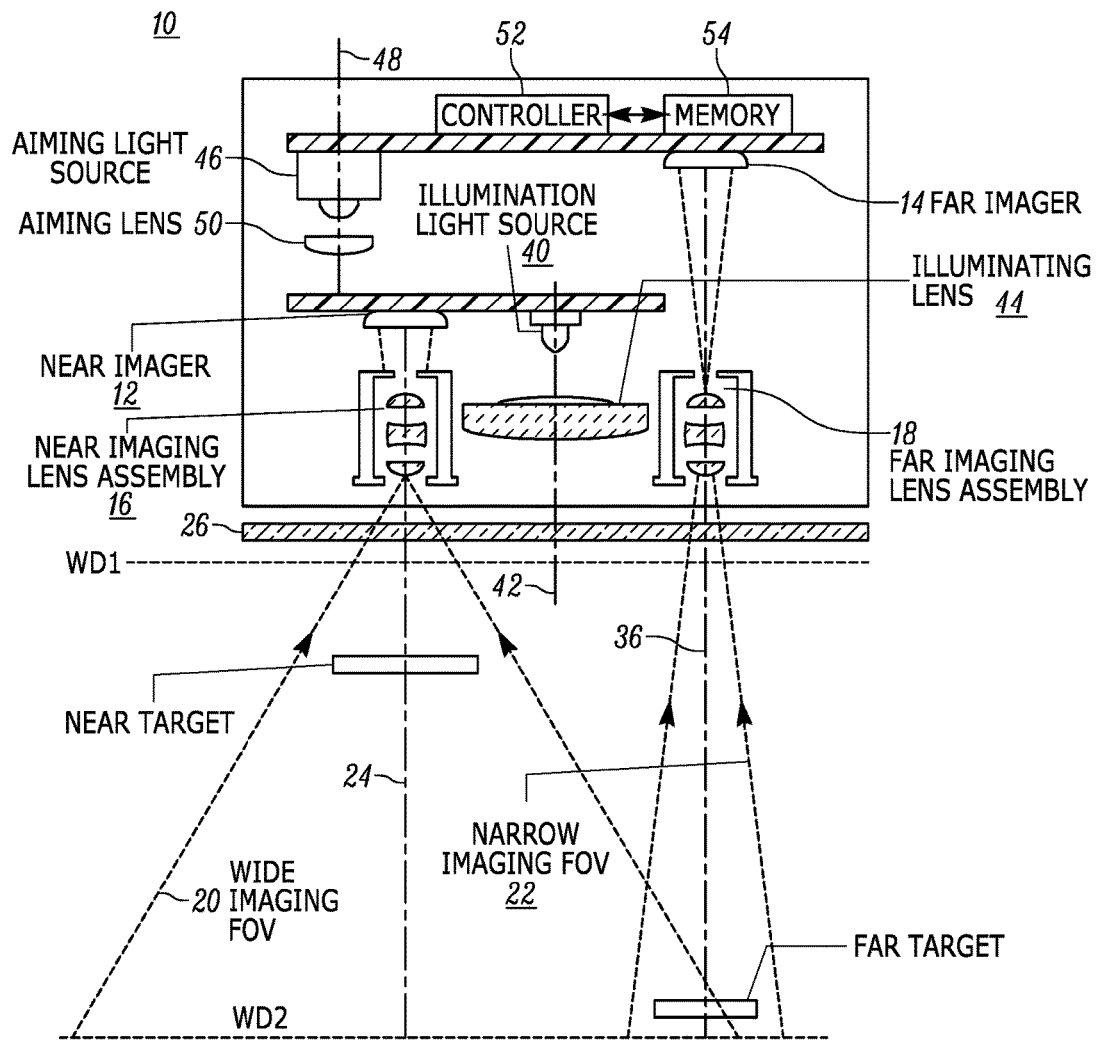
FIG. 2 is a schematic diagram of various components, including imaging, illuminating, and aiming assemblies supported on an imaging module that is mounted inside the reader of FIG. 1.
Figure 3:
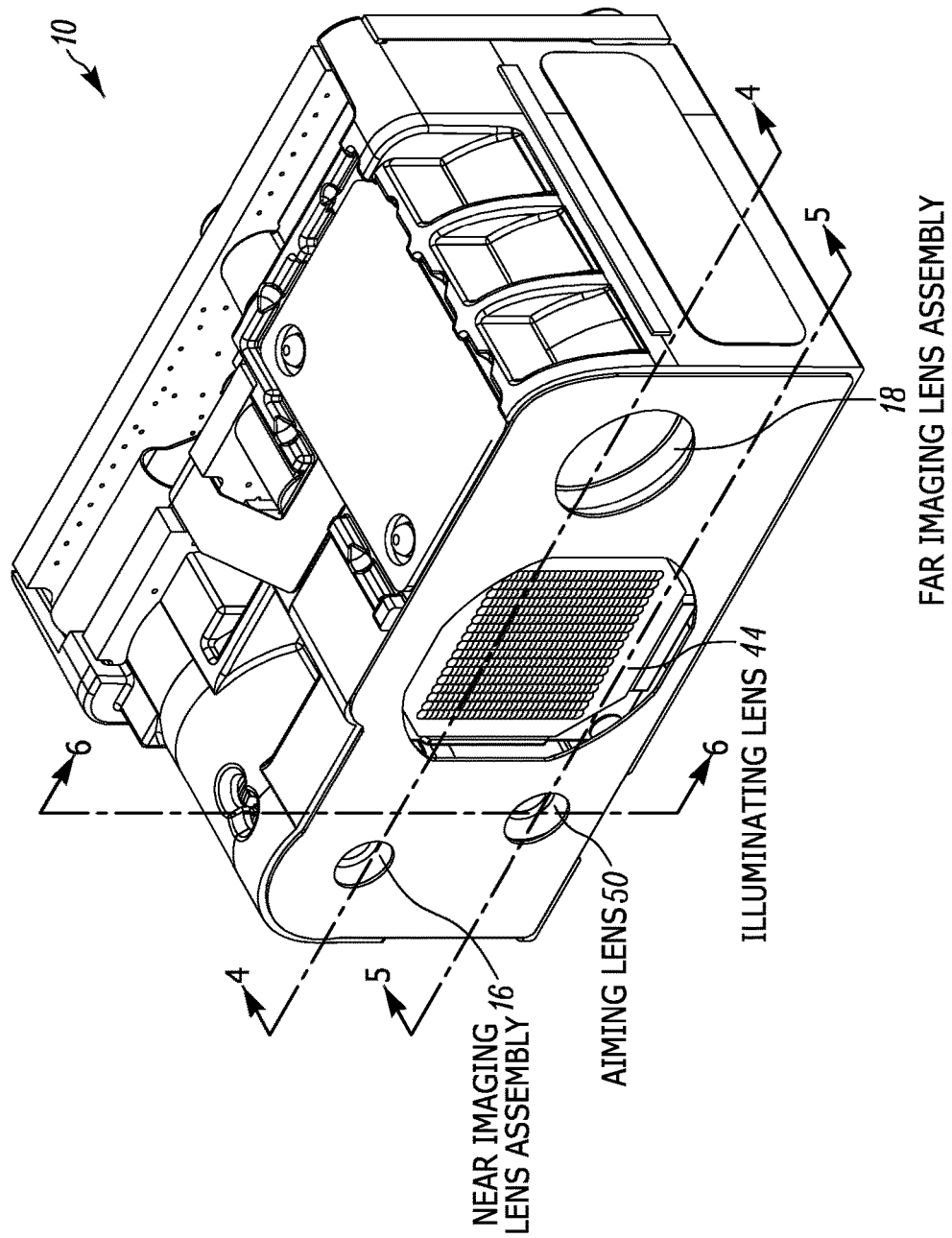
FIG. 3 is a perspective view of the imaging module of FIG. 2 in isolation.

As schematically shown in FIG. 2, and as more realistically shown in FIGS. 3-6, an imaging module 10 is mounted in the reader 30 behind the window 26 and is operative, as described below, for variably illuminating targets to be read by image capture through the window 26 over an extended range of working distances away from the module 10. A target may be located anywhere in a working range of distances between a close-in working distance (WD1) and a far-out working distance (WD2). In a preferred embodiment, WD1 is either at, or about eighteen inches away, from the window 26, and WD2 is much further away, for example, over about sixty inches away from the window 26. An intermediate working distance between WD1 and WD2 is about eighteen to about sixty inches away from the window 26. The module 10 includes an imaging assembly that has a near imaging sensor or imager 12, and a near imaging lens assembly 16 for capturing return light over a relatively wide imaging field of view 20, e.g., about thirty degrees, from a near target located in a close-in region of the range, e.g., from about zero inches to about eighteen inches away from the window 26, and for projecting the captured return light onto the near imager 12, as well as a far imaging sensor or imager 14, and a far imaging lens assembly 18 for capturing return light over a relatively narrow imaging field of view 22, e.g., about sixteen degrees, from a far target located in a far-out region of the range, e.g., greater than about sixty inches away from the window 26, and for projecting the captured return light onto the far imager 14. Although only two imagers 12, 14 and two imaging lens assemblies 16, 18 have been illustrated in FIG. 2, it will be understood that more than two could be provided in the module 10.

Each imager 12, 14 is a solid-state device, for example, a CCD or a CMOS imager having a one-dimensional array of addressable image sensors or pixels arranged in a single, linear row, or preferably a two-dimensional array of such sensors arranged in mutually orthogonal rows and columns, and operative for detecting return light captured by the respective imaging lens assemblies 16, 18 along respective imaging axes 24, 36 through the window 26. Each imaging lens assembly is advantageously a Cooke triplet, although other fixed focus and variable focus lens combinations can also be employed.

Figure 4:
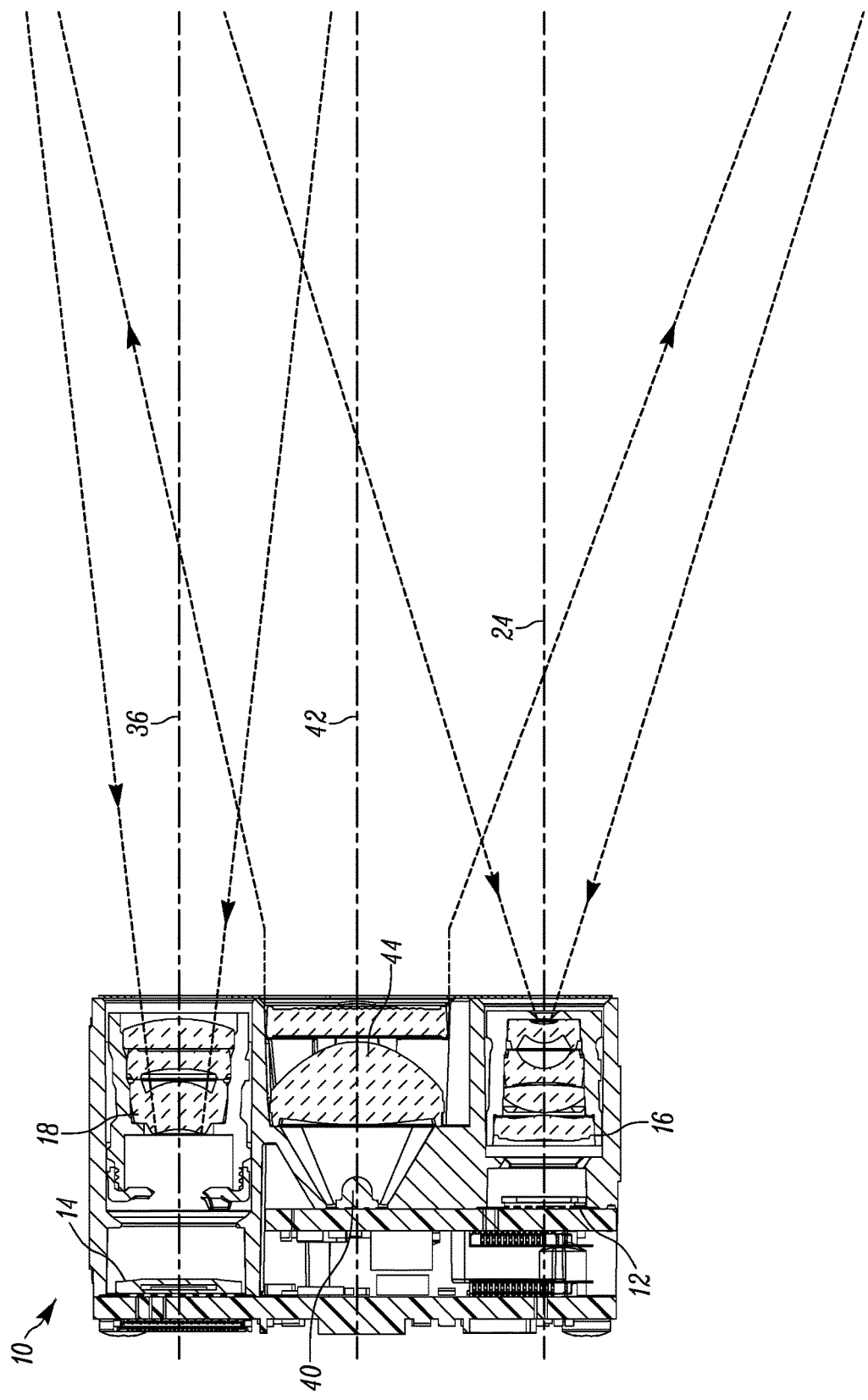
FIG. 4 is a cross-sectional view taken on line 4-4 of FIG. 3.
Figure 5:
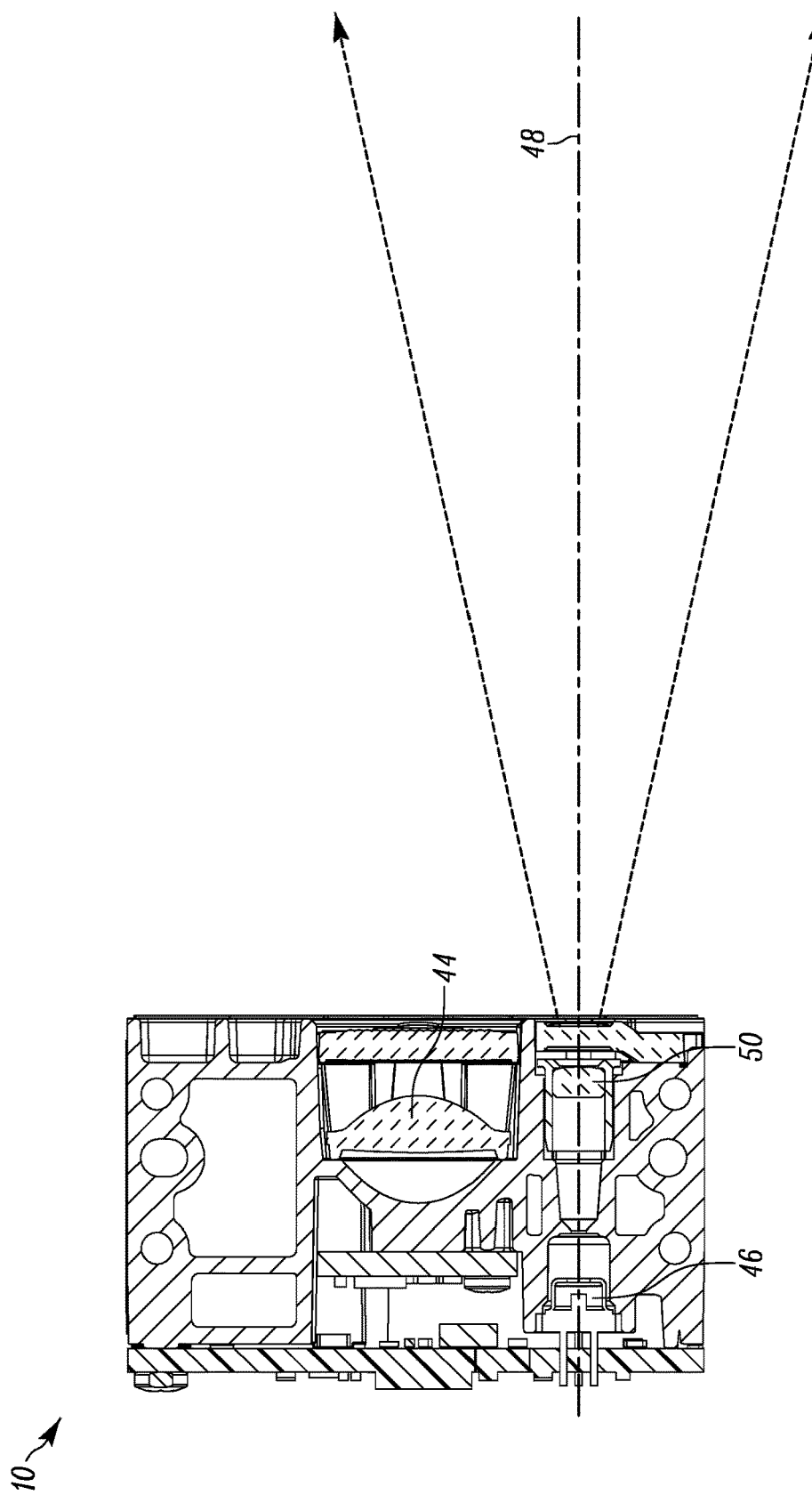
FIG. 5 is a cross-sectional view taken on line 5-5 of FIG. 3.
Figure 6:
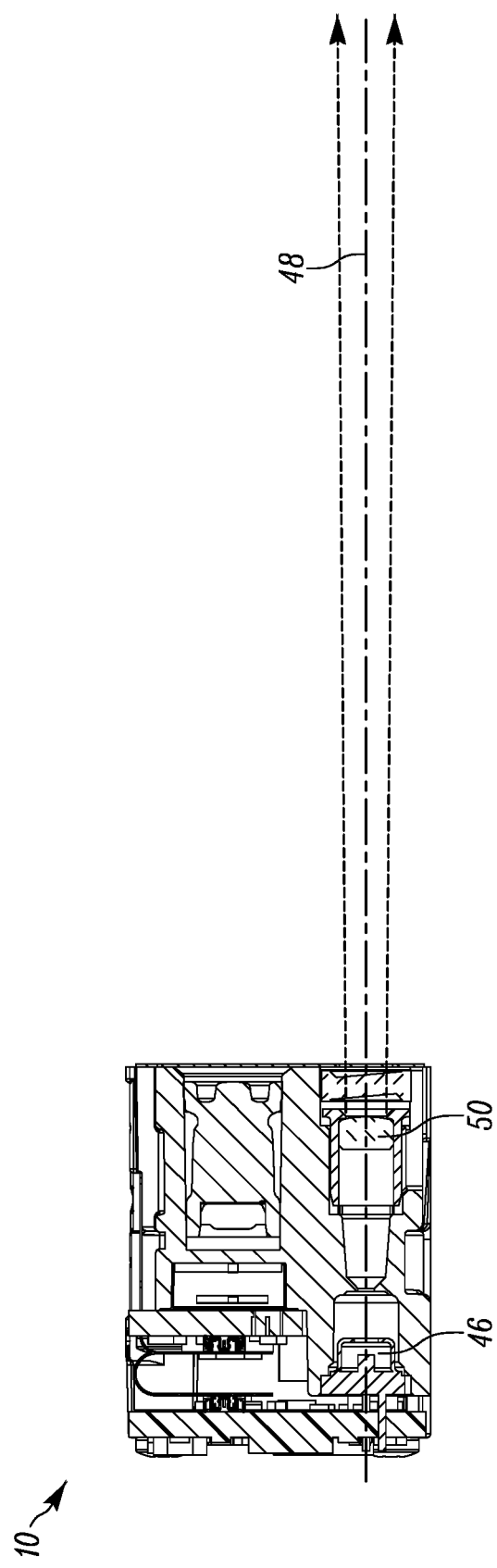
FIG. 6 is a vertical sectional view taken on line 6-6 of FIG. 3.

As also shown in FIGS. 2 and 4, an illuminating light assembly is also supported by the imaging module 10 and includes an illumination light source, e.g., at least one light emitting diode (LED) 40, stationarily mounted on an optical axis 42, and an illuminating lens assembly that includes an illuminating lens 44 also centered on the optical axis 42. The illuminating light assembly is shared by both imagers 12, 14. As further shown in FIGS. 2, 5 and 6, an aiming light assembly is also supported by the imaging module 10 and includes an aiming light source 46, e.g., a laser, stationarily mounted on an optical axis 48, and an aiming lens 50 centered on the optical axis 48. The aiming lens 50 may be a diffractive or a refractive optical element, and is operative for projecting a visible aiming light pattern on the target prior to reading.

As further shown in FIG. 2, the imagers 12, 14, the LED 40 and the laser 46 are operatively connected to a controller or programmed microprocessor 52 operative for controlling the operation of these components. A memory 54 is connected and accessible to the controller 52. Preferably, the controller 52 is the same as the one used for processing the return light from the targets and for decoding the captured target images.

The aforementioned aiming light assembly also serves as a range finder to determine the distance to the target. The aiming axis 48 is offset from the imaging axes 24, 36 so that the resulting parallax provides target distance information. More particularly, the parallax between the aiming axis 48 and either one of the imaging axes 24, 36 provides range information from the pixel position of the aiming beam on one of the imaging sensor arrays. It is preferred to use the imaging axis 36 of the far imager 14, because the parallax error will be greater for the far imager 14 than for the near imager 12. It will be understood that other types of range finders, e.g., acoustic devices, can be employed to determine the target distance. Thus, the range finder locates the target to determine whether the target is in a close-in region, or an intermediate region, or a far-out region, of the range.

In operation, once the target is located, the controller 52 either selects the near imager 12, and energizes the illuminating light assembly to illuminate the target with illumination light of a relatively lesser intensity when the range finder determines that the target to be imaged and read by the near imager 12 is located in a close-in region of the range; or selects the far imager 14, and energizes the illuminating light assembly to illuminate the target with illumination light of a relatively greater intensity when the range finder determines that the target to be imaged and read by the far imager 14 is located in a far-out region of the range; or alternately selects between the near imager 12 and the far imager 14, and energizes the illuminating light assembly to illuminate the target with illumination light of a relatively intermediate intensity that is between the lesser intensity and the greater intensity when the range finder determines that the target to be imaged and read by the alternately selected imager is located in an intermediate region that is between the close-in region and the far-out region of the range. In a preferred implementation, the far imager 14 is initially operated by default, and the near imager 12 is only selected if a close-in target is determined by the range finder.

The controller 52 can also adjust the focusing of the selected imager 12, 16 based on the determined target distance. The controller 52 energizes the LED 40 with a variable electrical current to vary the intensity of the illumination light. By way of non-limiting numerical example, the electrical current is on the order of 30 milliamperes when the close-in region lies between about 0.0 inches and about eighteen inches from the window 26, is on the order of 150 milliamperes when the intermediate region lies between about eighteen inches and about sixty inches from the window 26, and is on the order of 600 milliamperes when the far-out region lies between about sixty inches and infinity from the window 26. The controller 52 varies the intensity of the illumination light either as a continuous analog function, or as a stepwise, multi-level function, of the distance determined by the range finder.

Figure 7:
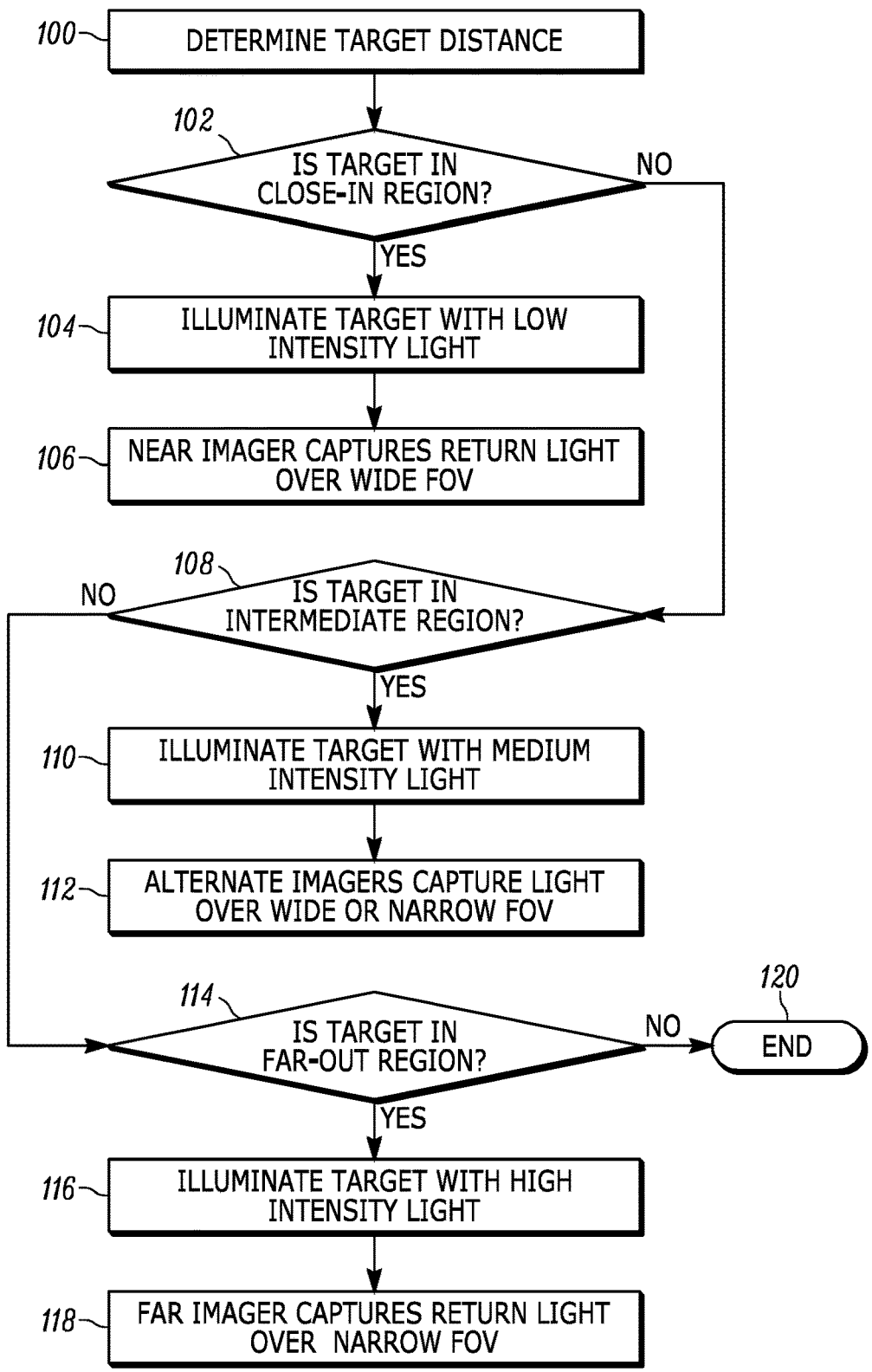
FIG. 7 is a flow chart depicting steps performed in accordance with a method of this disclosure.

The flow chart of FIG. 7 depicts the method disclosed herein. The target distance is determined by the range finder in step 100. In step 102, it is determined if the target is in the close-in region. If so, then the target is illuminated with low intensity light in step 104, and simultaneously, the near imager 12 is energized to capture the return light from the target over its wide field of view in step 106. If not, then it is determined if the target is in the intermediate region in step 108. If so, then the target is illuminated with intermediate intensity light in step 110, and simultaneously, the near imager 12 and the far imager 14 are alternately energized to capture the return light from the target over its wide or narrow field of view in step 112. If not, then it is determined if the target is in the far-out region in step 114. If so, then the target is illuminated with high intensity light in step 116, and simultaneously, the far imager 14 is energized to capture the return light from the target over its narrow field of view in step 118. If not, then the method ends at step 120.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for variably illuminating targets to be read by image capture over a range of working distances away from the module, comprising:
   an imaging assembly including a near imager for imaging the targets over a relatively wider imaging field of view, and a far imager for imaging the targets over a relatively narrower imaging field of view;
   an illuminating light assembly for illuminating the targets with illumination light having a variable, non-zero intensity;
   a range finder for determining a distance to a target; and
   a controller for selecting at least one of the imagers and for energizing the illuminating light assembly to illuminate the target with the illumination light having the variable, non-zero intensity that is a function of the distance determined by the range finder,
   wherein the controller is operable to vary the variable, non-zero intensity of the illumination light as a continuous function of the distance determined by the range finder.

2. The module of claim 1, wherein the controller is operative for selecting the near imager and for energizing the illuminating light assembly to illuminate the target with illumination light having a relatively lesser intensity when the range finder determines that the target to be imaged and read by the near imager is located in a close-in region of the range.

3. The module of claim 2, wherein the controller is operative for selecting the far imager and for energizing the illuminating light assembly to illuminate the target with illumination light of a relatively greater intensity when the range finder determines that the target to be imaged and read by the far imager is located in a far-out region of the range.

4. The module of claim 3, wherein the controller is operative for alternately selecting between the near imager and the far imager, and for energizing the illuminating light assembly to illuminate the target with illumination light of a relatively intermediate intensity that is between the lesser intensity and the greater intensity when the range finder determines that the target to be imaged and read by the alternately selected imager is located in an intermediate region that is between the close-in region and the far-out region of the range.

5. The module of claim 1, wherein each imager images the target along an optical axis, and wherein the range finder includes an aiming assembly for emitting an aiming beam along an aiming axis that is offset from at least one of the optical axes.

6. An imaging reader for reading targets by image capture over a range of working distances away from the reader, comprising:
   a housing having a light-transmissive window; and
   an imaging module supported by the housing and operative for variably illuminating the targets through the window, the imaging module including
      an imaging assembly including a near imager for imaging the targets through the window over a relatively wider imaging field of view, and a far imager for imaging the targets through the window over a relatively narrower imaging field of view,
      an illuminating light assembly for illuminating the targets through the window with illumination light having a variable, non-zero intensity,
      a range finder for determining a distance to a target, and
      a controller for selecting at least one of the imagers and for energizing the illuminating light assembly to illuminate the target with the illumination light having the variable, non-zero intensity that is a function of the distance determined by the range finder,
   wherein the controller is operable to vary the variable, non-zero intensity of the illumination light as a continuous function of the distance determined by the range finder.

7. The reader of claim 6, wherein the controller is operative for selecting the near imager and for energizing the illuminating light assembly to illuminate the target with illumination light having a relatively lesser intensity when the range finder determines that the target to be imaged and read by the near imager is located in a close-in region of the range.

8. The reader of claim 7, wherein the controller is operative for selecting the far imager and for energizing the illuminating light assembly to illuminate the target with illumination light of a relatively greater intensity when the range finder determines that the target to be imaged and read by the far imager is located in a far-out region of the range.

9. The reader of claim 8, wherein the controller is operative for alternately selecting between the near imager and the far imager, and for energizing the illuminating light assembly to illuminate the target with illumination light of a relatively intermediate intensity that is between the lesser intensity and the greater intensity when the range finder determines that the target to be imaged and read by the alternately selected imager is located in an intermediate region that is between the close-in region and the far-out region of the range.

10. The reader of claim 6, wherein each imager captures the return light along an optical axis, and wherein the range finder includes an aiming assembly for emitting an aiming beam along an aiming axis that is offset from at least one of the optical axes.

11. A method of variably illuminating targets to be read by image capture over a range of working distances, the method comprising:
   providing a near imager to image the targets over a relatively wider imaging field of view;
   providing a far imager to capture image the targets over a relatively narrower imaging field of view;
   providing an illuminator for illuminating the targets with illumination light having a variable, non-zero intensity;
   determining a distance to a target;
   selecting at least one of the imagers;
   illuminating the target with the illumination light having the variable, non-zero intensity that is a function of the determined distance; and and varying the variable, non-zero intensity of the illumination light as one of a continuous function and a stepwise function of the determined distance.

12. The method of claim 11, wherein the selecting is performed by selecting the near imager, and wherein the illuminating is performed by illuminating the target with illumination light having a relatively lesser intensity when the determined distance is located in a close-in region of the range.

13. The method of claim 12, wherein the selecting is performed by selecting the far imager, and wherein the illuminating is performed by illuminating the target with illumination light of a relatively greater intensity when the determined distance is located in a far-out region of the range.

14. The method of claim 13, wherein the selecting is performed by alternately selecting between the near imager and the far imager, and wherein the illuminating is performed by illuminating the target with illumination light of a relatively intermediate intensity that is between the lesser intensity and the greater intensity when the determined distance is located in an intermediate region that is between the close-in region and the far-out region of the range.

15. The method of claim 11, wherein each imager captures the return light along an optical axis, and wherein the determining is performed by emitting an aiming beam along an aiming axis that is offset from at least one of the optical axes.

* * * * *